US009145048B2

(12) United States Patent
King et al.

(10) Patent No.: US 9,145,048 B2
(45) Date of Patent: Sep. 29, 2015

(54) APPARATUS FOR HYBRID ENGINE CONTROL AND METHOD OF MANUFACTURE SAME (75) Inventors: Robert Dean King, Schenectady, NY (US); Lembit Salasoo, Schenectady, NY (US); Gary Raymond Kilinski, Scotia, NY (US); Christopher Michael Wynnyk, Albany, NY (US)

(73) Assignee: General Electric Company, Schenectady, NY (US)

( * ) Notice: Subject to any disclaimer, the term of this patent is extended or adjusted under 35 U.S.C. 154(b) by 1275 days.

(21) Appl. No.: 12/751,612

(22) Filed: Mar. 31, 2010

(65) Prior Publication Data

US 2011/0246005 A1  Oct. 6, 2011

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60K 6/48* | (2007.10) |
| *B60W 10/06* | (2006.01) |

(Continued)

(52) U.S. Cl.
CPC .................. *B60K 6/48* (2013.01); *B60W 10/06* (2013.01); *B60W 10/08* (2013.01); *B60W 10/11* (2013.01); *B60W 20/102* (2013.01); *B60W 50/0097* (2013.01); *B60W 50/082* (2013.01); *B60W 2510/0638* (2013.01); *B60W 2510/0657* (2013.01); *B60W 2510/081* (2013.01); *B60W 2510/083* (2013.01); *B60W 2530/18* (2013.01); *Y02T 10/6221* (2013.01); *Y02T 10/6269* (2013.01); *Y02T 10/6291* (2013.01); *Y02T 10/84* (2013.01)

(58) Field of Classification Search
CPC .......... B60W 50/082; B60W 50/0097; B60W 20/102; B60W 10/11; B60W 10/08; B60W 10/06; B60K 6/48
USPC .......................................................... 701/22
See application file for complete search history.

(56) References Cited

U.S. PATENT DOCUMENTS

| | | | |
|---|---|---|---|
| 6,404,332 B1 | 6/2002 | Wakashiro et al. | |
| 7,360,615 B2 | 4/2008 | Salman et al. | |

(Continued)

FOREIGN PATENT DOCUMENTS

| | | |
|---|---|---|
| CN | 101596902 A | 12/2009 |
| EP | 1860354 A1 | 11/2007 |

(Continued)

OTHER PUBLICATIONS

EP Search Report issued in connection with corresponding EP Patent Application No. 111600771 filed on Mar. 28, 2011.

(Continued)

*Primary Examiner* — Maceeh Anwari (57) ABSTRACT

An apparatus includes a transmission, an engine coupled to an input side of the transmission, and an electromechanical device coupled to an output side of the transmission. The apparatus also includes a differential coupled to the output side of the electromechanical device and a controller coupled to the electromechanical device. The controller is programmed to receive a travel range estimate and control operation of the electromechanical device based on the travel range estimate.

28 Claims, 6 Drawing Sheets

(51) Int. Cl.
*B60W 10/08* (2006.01)
*B60W 10/11* (2012.01)
*B60W 20/00* (2006.01)
*B60W 50/00* (2006.01)
*B60W 50/08* (2012.01)

(56) References Cited

U.S. PATENT DOCUMENTS

| | | | |
|---|---|---|---|
| 7,780,562 B2 | 8/2010 | King et al. | |
| 2002/0107618 A1 | 8/2002 | Deguchi et al. | |
| 2004/0178756 A1 | 9/2004 | Zhenxing | |
| 2005/0274553 A1* | 12/2005 | Salman et al. | 180/65.2 |
| 2006/0000650 A1 | 1/2006 | Hughey | |
| 2007/0163819 A1* | 7/2007 | Richter et al. | 180/65.2 |
| 2008/0093136 A1 | 4/2008 | Miller | |
| 2008/0276825 A1 | 11/2008 | King et al. | |
| 2009/0198398 A1* | 8/2009 | Yamada | 701/22 |
| 2009/0223725 A1 | 9/2009 | Rodriguez et al. | |
| 2009/0277701 A1 | 11/2009 | Soma et al. | |

FOREIGN PATENT DOCUMENTS

| | | |
|---|---|---|
| EP | 1923255 A1 * | 5/2008 |
| JP | 08-265909 A | 10/1996 |
| JP | 2009-143478 A | 7/2009 |

OTHER PUBLICATIONS

Unofficial Chinese Search Report issued in connection with corresponding CN Application No. 201110093490.0 dated Nov. 19, 2014.

* cited by examiner

APPARATUS FOR HYBRID ENGINE CONTROL AND METHOD OF MANUFACTURE SAME

BACKGROUND OF THE INVENTION

Embodiments of the invention relate generally to electric drive systems including hybrid and electric vehicles and to stationary drives that are subject to transient or pulsed loads and, more particularly, to transferring energy between an electrical storage device of the vehicle or drive and a power source external to the vehicle or drive.

Hybrid electric vehicles may combine an internal combustion engine and an electric motor powered by an energy storage device, such as a traction battery, to propel the vehicle. Typically, the electric motor is coupled between the internal combustion engine and the transmission to take advantage of the torque increase through the transmission. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Plug-in hybrid vehicles are configured to use electrical energy from an external source to re-charge the traction battery. Such vehicles may include on-road and off-road vehicles, golf cars, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery.

While hybrid vehicles offer many advantages, hybrid vehicles also include additional components not found in a conventional internal combustion vehicle. To convert a conventional vehicle to a hybrid vehicle, significant changes must be made to the vehicle chassis and the vehicle control system. For example, a hybrid vehicle includes a motor capable of driving the wheels and also operating as a generator when driven by the wheels. A hybrid vehicle also includes a controller to control power flow between the motor and an energy storage device. The hybrid vehicle controller may also receive driver commands that are used for control of conventional internal combustion engine vehicles and/or control of additional inputs related to hybrid mode of operation.

One method of converting a conventional vehicle to a hybrid vehicle includes integrating the controller utilized to control the hybrid components into the engine controller. While this method allows the modified engine controller to control both the engine components and the motor components, modifying the engine or engine controller is difficult and costly as engine controllers typically include a microprocessor to control the engine and vehicle functions. In order to modify the microprocessor, specialized tools and knowledge generally proprietary to the vehicle manufacturer is needed. Further, space constraints may limit the ability to couple an electric drive system between the engine and the transmission. As a result, modifying a conventional vehicle to a hybrid vehicle to take full advantage of the increased fuel efficiency of the hybrid vehicle system may be difficult and cost prohibitive.

It would therefore be desirable to provide an apparatus and method to convert a conventional vehicle to a hybrid vehicle that overcomes the aforementioned drawbacks.

BRIEF DESCRIPTION OF THE INVENTION

Embodiments of the invention provide an apparatus for hybrid drive torque control and a method for manufacturing same.

In accordance with one aspect of the invention, an apparatus includes a transmission, an engine coupled to an input side of the transmission, and an electromechanical device coupled to an output side of the transmission. The apparatus also includes a differential coupled to the output side of the electromechanical device and a controller coupled to the electromechanical device. The controller is programmed to receive a travel range estimate, monitor an operating characteristic of the engine, and monitor an operating characteristic of the transmission. The controller is further programmed to monitor an operating characteristic of the electromechanical device and control operation of the electromechanical device based on the travel range estimate, the operating characteristic of the engine, the operating characteristic of the transmission, and the operating characteristic of the electromechanical device.

In accordance with another aspect of the invention, a method of manufacturing a hybrid vehicle includes providing an internal combustion engine (ICE) propulsion system comprising an ICE, a transmission, and at least one drive shaft coupled to an output of the transmission. The method also includes coupling a motor/generator unit to the transmission, coupling the motor/generator unit to a differential via a first drive shaft such that substantially all of a torque output of the ICE is directed through the motor/generator unit to the differential, and providing a first sensor system to monitor operating conditions of the ICE. The method further includes providing a second sensor system to monitor operating conditions of the motor/generator unit and coupling a controller to the motor/generator unit. The controller is programmed to receive a trip range estimate from an operator, receive an output of the first sensor system and an output of the second sensor system, and operate the motor/generator unit based on the trip range estimate and the output of the first and second sensor systems.

In accordance with another aspect of the invention, a retrofit kit includes an electric motor mechanically coupleable between a transmission and a differential of an internal combustion vehicle, an energy storage system electrically coupleable to the electric motor, and a control system electrically coupleable to the electric motor. The control system is configured to receive a trip estimate corresponding to an expected driving range, monitor operating conditions of the electric motor and the internal combustion vehicle, and operate the electric motor based on the trip estimate and the monitored operating conditions.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
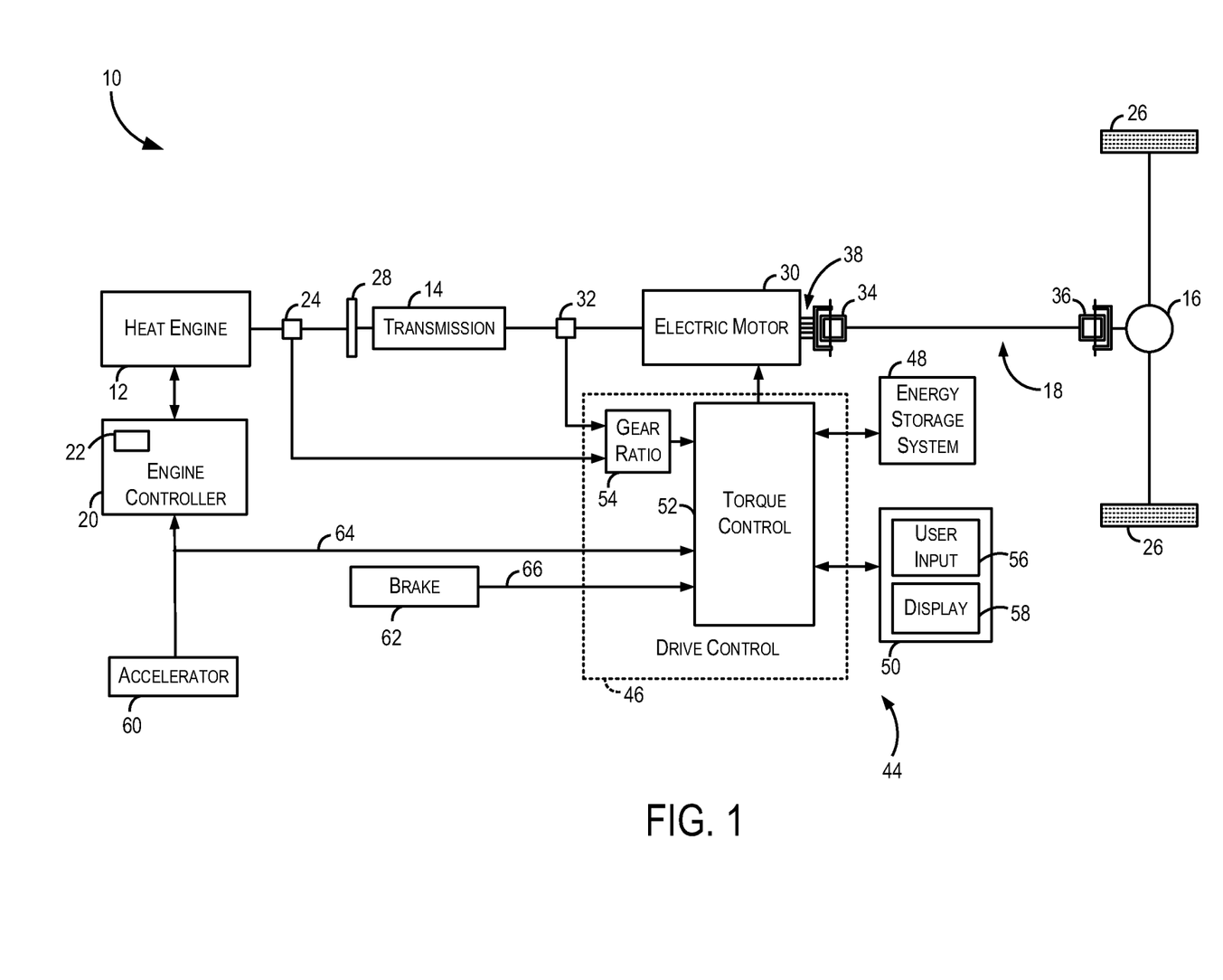
FIG. 1 is a schematic diagram of a hybrid vehicle including a hybrid control system in accordance with an embodiment of the invention.

FIG. 1 illustrates a hybrid vehicle 10, such as an automobile, truck, bus, or off-road vehicle, for example. Vehicle 10 includes a heat engine 12, a transmission 14 coupled to engine 12, a differential 16, and a drive shaft assembly 18 coupled between transmission 14 and differential 16. According to various embodiments, engine 12 may be an internal combustion gasoline engine, an internal combustion diesel engine, an external combustion engine, or a gas turbine engine, for example. An engine controller 20 is provided to control operation of engine 12. According to one embodiment, engine controller 20 includes one or more sensors 22 that are configured to sense operating conditions of engine 12. Sensors 22 may include an rpm sensor, a torque sensor, an oxygen sensor, and a temperature sensor as examples. As such, engine controller 20 is configured to transmit or receive data from engine 12. Vehicle 10 also includes an engine speed sensor 24 that measures the crankshaft speed of engine 12. According to one embodiment, speed sensor 24 may measure engine crankshaft speed from a tachometer (not shown) in pulses per second, which may be converted to a revolutions per minute (rpm) signal.

Vehicle 10 also includes at least two wheels 26 that are coupled to respective ends of differential 16. In one embodiment, vehicle 10 is configured as a rear wheel drive vehicle such that differential 16 is positioned near the aft end of vehicle 10 and is configured to drive at least one of the wheels 26. Optionally, vehicle 10 may be configured as a front-wheel drive vehicle.

In one embodiment, transmission 14 is a manually operated transmission that includes a plurality of gears such that the input torque received from engine 12 is multiplied via a plurality of gear ratios and transmitted to differential 16 through drive shaft assembly 18. According to such an embodiment, vehicle 10 includes a clutch 28 configured to selectively connect and disconnect engine 12 and transmission 14.

Vehicle 10 also includes an electromechanical device such as an electric motor or electric motor/generator unit 30 coupled along drive shaft assembly 18 between transmission 14 and differential 16 such that substantially all the torque generated by engine 12 is transmitted through transmission 14 and through electric motor or electric motor/generator unit 30 to differential 16. A speed sensor 32 is included to monitor an operating speed of electric motor 30.

According to one embodiment, electric motor 30 is directly coupled to transmission 14, and drive shaft assembly 18 comprises one axle or drive shaft coupled to differential 16 through a mating pair of universal joints 34, 36 at each end of the single drive shaft such that substantially all of a torque output of heat engine 12 passes though electric motor 30 to differential 16. A spline interface or coupling 38 is provided to couple the torque between electric motor 30 and universal joint 34. One skilled in the art will recognize that spline interface 38 may be rigidly attached to electric motor 30 or may be moveable to accommodate a movement of axle components as the suspension system of vehicle 10 is moved over its entire range.

Figure 2:
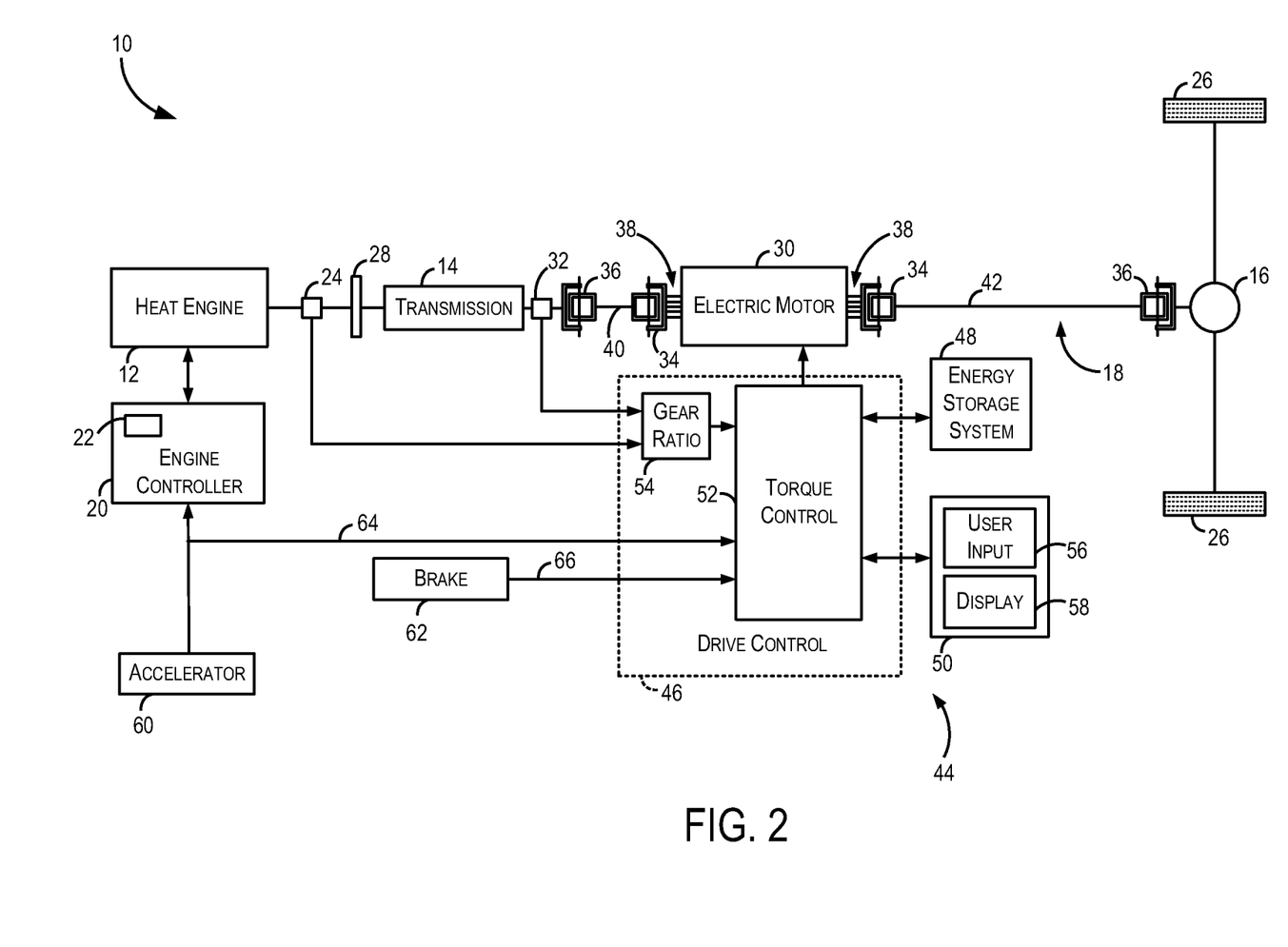
FIG. 2 is a schematic diagram of a hybrid vehicle including a hybrid control system in accordance with another embodiment of the invention.

Alternatively, as shown in FIG. 2, electric motor 30 may be coupled between multiple drive shafts 40, 42 of drive shaft assembly 18, wherein each drive shaft 40, 42 comprises a mating pair of universal joints 34, 36 at each end. That is, drive shaft 40 is coupled between transmission 14 and electric motor 30, and drive shaft 42 is coupled between electric motor 30 and differential 16. As shown, electric motor 30 is coupled to universal joints 34 via spline interfaces 38. Alternatively, electric motor 30 may be coupled to universal joints 34 without a spline interface at one or both sides of electric motor 30.

According to yet another embodiment, depending on the vehicle type, three or more drive shaft assembly segments may be used to maximize ground clearance or to minimize the maximum angle at which the universal joints must operate as the suspension system travels through extreme movement. Such an embodiment with three or more drive shaft assemblies or segments may be used in a truck, for example.

Referring again to FIG. 1, a hybrid drive control system 44 is provided to control operation of electric motor 30 and includes a drive control 46, an energy storage system 48, and a user interface 50. Drive control 46 is coupled to motor/generator unit 30 and includes a torque control 52 and an effective gear ratio calculation algorithm 54. Energy storage system 48 is coupled to drive control 46 and comprises a plurality of energy storage units such as sodium metal halide batteries, sodium nickel chloride batteries, sodium sulfur batteries, nickel metal hydride batteries, lithium ion batteries, lithium polymer batteries, nickel cadmium batteries, a plurality of ultracapacitor cells, combination of ultracapacitors and batteries, or a fuel cell for example. User interface 50 is also coupled to motor/generator unit 30 through torque control 52. User interface 50 includes a user input 56 and a user display 58, the embodiments of which are described in more detail with respect to FIG. 3.

An accelerator pedal 60 and brake pedal 62 are also included in vehicle 10. Accelerator pedal 60 is configured to send throttle command signals or accelerator pedal signals 64 to engine controller 20 and drive control 46. Brake pedal 62 sends a brake pressure or brake pedal position signal 66 to torque control 52.

Figure 3:
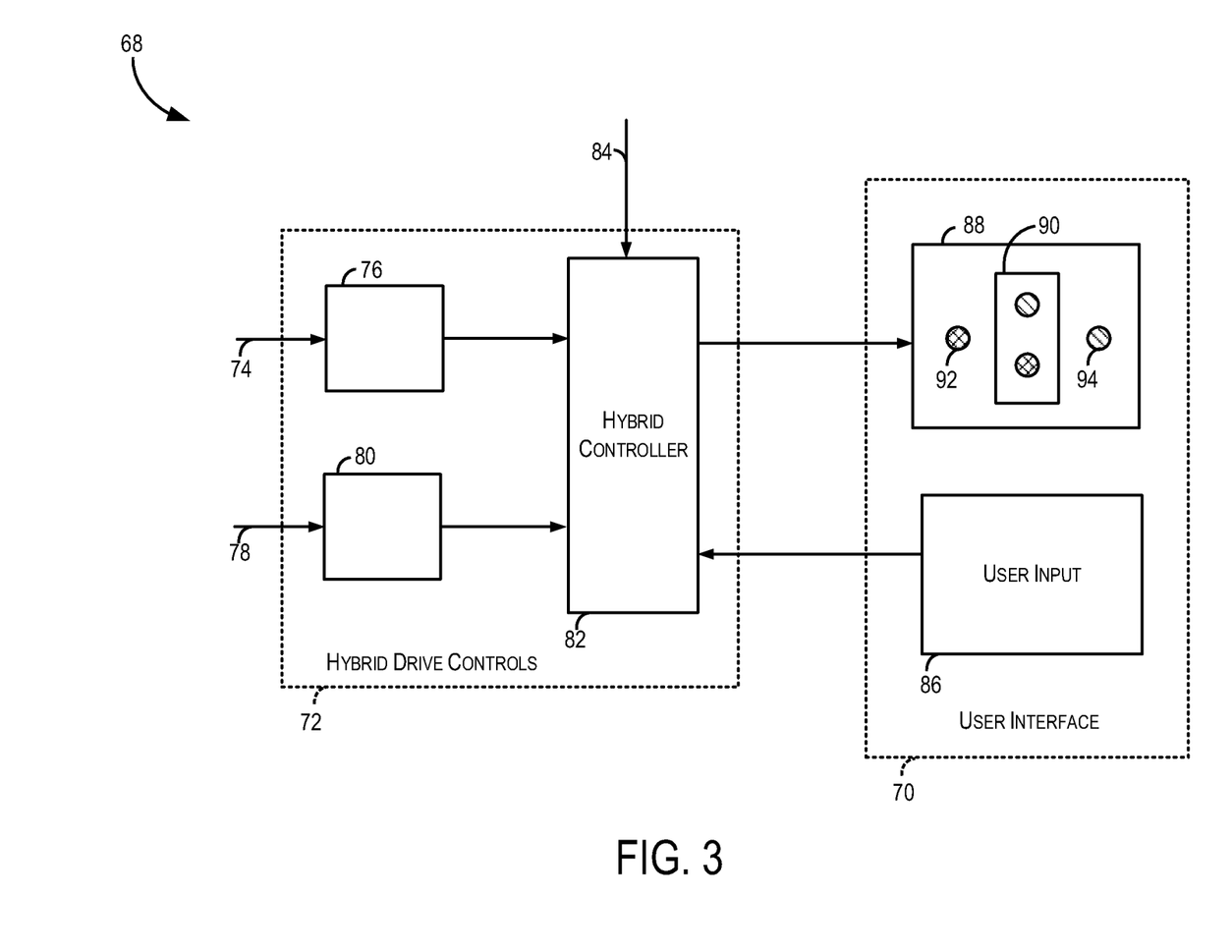
FIG. 3 is a schematic diagram of a hybrid control system in accordance with an embodiment of the invention.

FIG. 3 illustrates one embodiment of a hybrid drive control system 68, such as hybrid drive control system 44 of FIG. 1. As shown in FIG. 3, control system 68 includes a user interface 70 and a drive control 72. Drive control 72 receives signals 74 corresponding to operating characteristics of an engine, such as vehicle speed, engine speed and engine fuel injector duty cycle, drive shaft speed, motor speed, and motor torque. According to one embodiment, drive control 72 references stored engine data 76 corresponding to heat engine operation and efficiency, such as an engine map and a look-up table for brake-specific fuel consumption, engine speed, and fuel injector duty cycle. Likewise, drive control 72 receives motor signals 78 corresponding to operating characteristics of an electric motor/generator unit, including motor speed and motor torque for example. Drive control 72 also references stored motor data 80 corresponding to operation of the electric motor/generator unit, such as an electric drive system efficiency map and a look-up table for drive efficiency, motor speed, torque, and DC link voltage. Data referenced from the motor and engine maps and look-up tables is input to hybrid controller 82 along with vehicle speed data 84.

Hybrid controller 82 also interfaces with user interface 70, which includes a user input 86 with one or more user-selectable settings. According to one embodiment, user input 86 receives an input corresponding to a trip estimate or estimated range of travel such as a user's estimated driving distance at the beginning of a daily commute. For example, the user may select between a number of range settings on a multi-position switch or dial with settings corresponding to an estimated driving distance for the day, such as a short-range setting for urban driving, a mid-range setting for medium distance trips, and a long-range setting for longer trips. Alternatively, the user may select a distance setting based on an estimated driving distance until the next battery charge event (i.e., the next time the energy storage system will be plugged in). It is contemplated that the number of range or distance settings may be different from that described herein and may depend, for example, on a desired level of precision. User input 86 may also include a setting that allows the user to manually disable the hybrid drive such that the vehicle operates as a conventional combustion vehicle. Further, user input 86 may include a driving mode setting that allows the user to select between a number of driving mode settings, such as, for example, a "sport mode" that maximizes acceleration performance and an "economy mode" that minimizes peak power consumption to increase battery life and/or minimizes fuel consumption. The user-selected settings are transmitted from user input 86 to hybrid controller 82.

Hybrid controller 82 uses the received information regarding the user-selected settings, vehicle speed information, and data referenced from the motor and engine maps and look-up tables to determine a shift command. The shift command is transmitted to a display 88 and illuminates a visual indicator 90 to alert the user whether to "up shift" or "down shift" the vehicle transmission. According to embodiments of the invention, display 88 may also include a fault indicator 92 and a visual indicator 94, which may correspond to an ON/OFF condition of the hybrid drive. One skilled in the art will readily recognize that display 88 may include any number of additional or alternative visual or audio indicators corresponding to vehicle operating conditions or vehicle settings.

Figure 4:
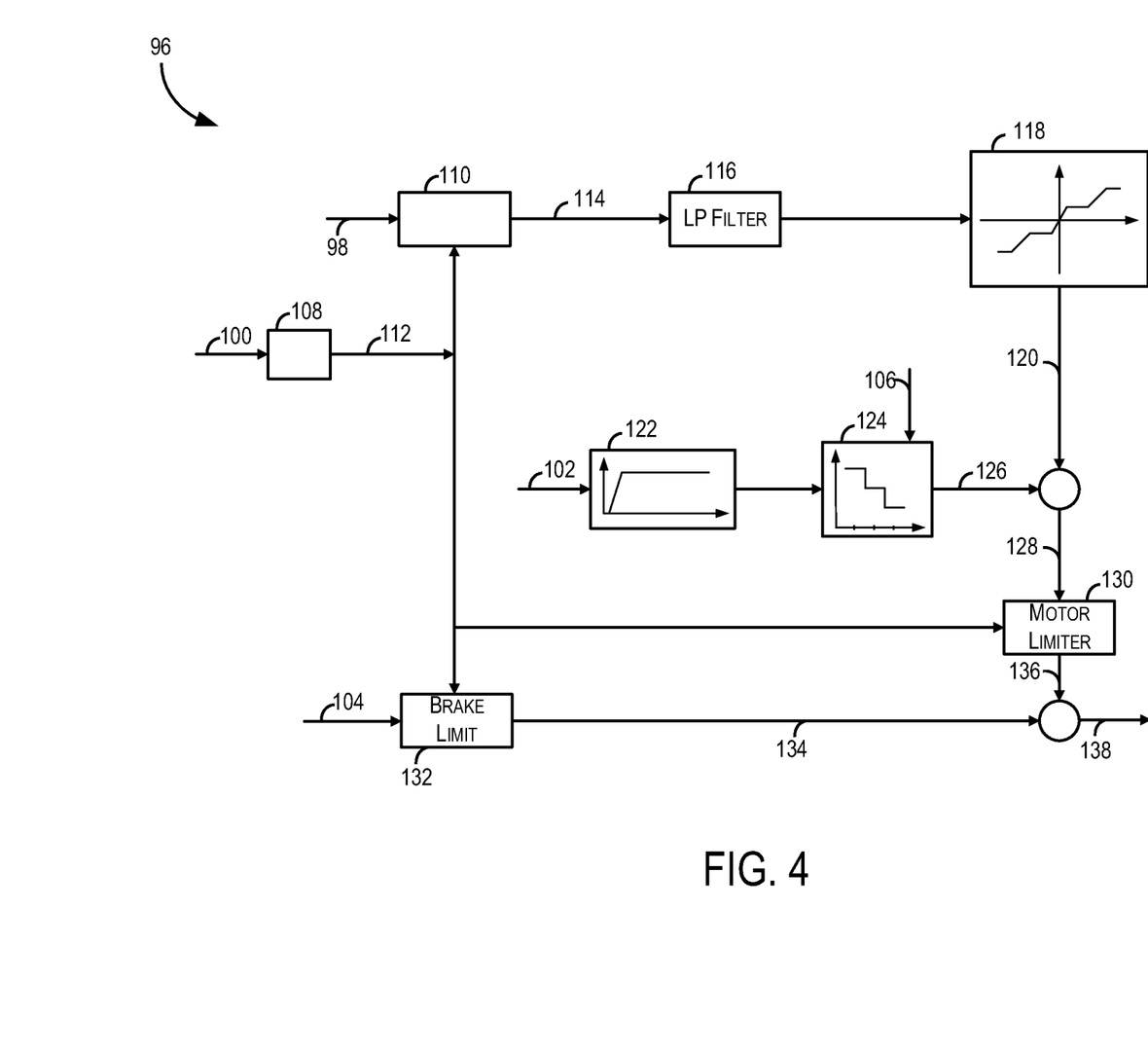
FIG. 4 is a simplified operational diagram of a control strategy for a hybrid vehicle in accordance with an embodiment of the invention.

FIG. 4 is a simplified operational diagram of a control strategy 96 for a control system of a hybrid vehicle, such as hybrid drive control system 44 of hybrid vehicle 10 of FIG. 1. As shown in FIG. 4, control strategy 96 receives a number of inputs regarding the operating conditions of the vehicle, including an engine speed signal 98, an electric motor signal 100, an accelerator pedal signal 102, and a brake pedal signal 104. Control strategy 96 also receives an operator input signal 106, such as from user input 86 of FIG. 3 for example, which may correspond to an operator's expected daily trip range estimate or an estimated driving range until the next expected recharge of the energy storage system if the vehicle is a Plug-In Hybrid Vehicle (PHEV). Electric motor signal 100 may include information regarding the motor speed and direction, for example. Electric motor signal 100 is passed through a motor calculation block 108 wherein motor signal 100 is scaled and/or has a constant value added thereto. At calculation block 110, engine speed signal 98 and an output 112 from motor calculation block 108 are used to calculate an effective gear ratio 114 for the vehicle. The calculated effective gear ratio 114 is passed through a low pass filter 116 and then input into a torque limiter 118, which determines a torque output 120 to apply to the hybrid drive based on a direction of vehicle motion and the calculated effective gear ratio 114.

Accelerator pedal signal 102 is passed through a ramp function 122 that scales or limits the accelerator pedal input. The output from function 122 is input into a gain filter 124, which determines a final accelerator input 126 based on operator input signal 106. For example, gain filter 124 may be configured to determine final accelerator input 126 for hybrid drive control based on a daily range or mileage estimate input by the operator. Using the torque output 120 and final accelerator input 126, control strategy 96 determines a hybrid drive accelerator torque 128, which is input to an electric motor torque limiter 130. In operation, when the operator indicates an expected relatively low daily range or low mileage until the next expected recharge event, the hybrid drive control allows increased levels of electric motor torque and, therefore, more rapid depletion of on-board stored energy as compared to the case where a longer expected daily range or higher mileage is input by the operator.

Control strategy 96 scales brake pedal signal 104 and passes the scaled brake signal 104 to a brake torque limit 132. A limited brake torque signal 134 and limited accelerator torque signal 136 are used to calculate a hybrid drive torque command 138.

Figure 5:
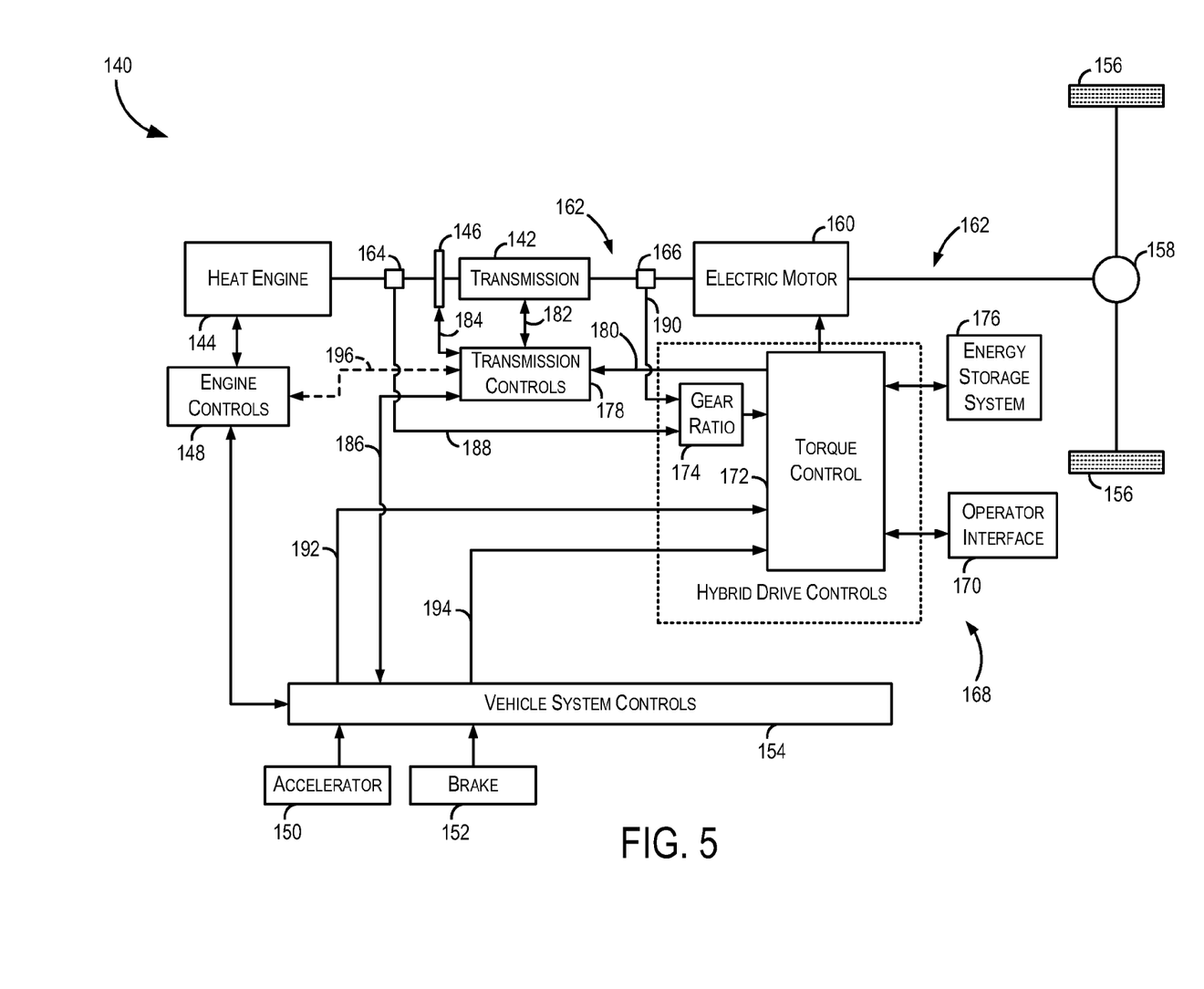
FIG. 5 is a schematic diagram of a hybrid vehicle including an automatic transmission in accordance with an embodiment of the invention.

FIG. 5 illustrates a hybrid vehicle 140 with an automatic transmission 142 coupled to a heat engine 144 via a torque converter 146, according to an embodiment of the invention. An engine controller 148 controls operation of heat engine 144. An accelerator pedal 150 and a brake pedal 152 are electronically coupled to vehicle system controls 154, which transmit signals to and from engine controls 148 and may be equipped with a computer area network (CAN or CAN-bus), according to one embodiment. Hybrid vehicle 140 also includes at least two wheels 156 coupled to a differential 158. An electric motor 160 is coupled between automatic transmission 142 and differential 158 along at least one drive shaft assembly 162. According to one embodiment, drive shaft assembly includes a mating pair of universal joints (not shown) at each end of the drive shaft assembly. One or more drive shaft assemblies may be used to couple automatic transmission 142 and differential 158. Hybrid vehicle 140 also includes a heat engine speed sensor 164 and an electric motor speed sensor 166, which may be configured in a similar manner as sensors 24, 32 of FIG. 1.

A hybrid drive system 168 is provided to control operation of electric motor 160. An operator interface 170 is coupled to hybrid drive system 168 and is configured in a similar manner as user interface 50 of FIG. 1 and user interface 70 of FIG. 3. Hybrid drive system 168 includes a hybrid torque control 172, an effective gear ratio calculation 174, and an energy storage system 176. Hybrid vehicle 140 further includes a transmission control unit 178, which receives signals 180 from hybrid torque control 172, and communicates with automatic transmission 142, torque converter 146, and vehicle system controls 154 via respective bi-directional signals 182, 184, and 186.

In operation, hybrid drive system 168 receives an engine speed signal 188 and a transmission output speed signal 190, which are used in calculating the effective gear ratio 174. Hybrid drive system 168 also receives an accelerator pedal signal 192 and a brake signal 194, which may include information regarding brake pressure and/or a brake pedal position, from vehicle system controls 154. Hybrid torque control 172 operates the electric motor 160 based on the received accelerator and brake signals 192, 194, the effective gear ratio calculation 174, inputs received from operator interface 170, and a state of charge of energy storage system 176.

According to one embodiment of the present invention, hybrid drive controls 168 may modify the operation of torque converter 146 to allow an increased level of energy to be captured in the electric drive system during a regenerative braking event. For example, during regenerative braking, when the available electric motor torque and associated energy storage state of charge (SOC) are within appropriate levels, signal 180 from hybrid drive torque control 172 to transmission control unit 178 may command torque converter 146 to be "unlocked." Unlocking torque converter 146 reduces the compression braking effect from heat engine 144 and allows an increase in electric regenerative torque, which increases energy capture and reduces petroleum fuel consumption.

In another embodiment, the relative torque provided by heat engine 144 compared to the torque provided by electric motor 160 and associated hybrid drive controls 168 is allocated based on the daily range estimate for vehicle 140 and will influence the operating gear ratio of automatic transmission 142. In such an embodiment, engine controller 148 is configured to provide a level of control of automatic transmission 142 via optional transmission control signals 196 (shown in phantom) between engine controls 148 and transmission control unit 178. Transmission control signals 196 cause transmission control unit 178 to run a torque converter lockup function and/or transmit gear shift commands to automatic transmission 142. For example, when operator interface 170 indicates a short trip and the "economy" mode is selected, hybrid drive torque controls 172 may transmit a transmission shift command to cause automatic transmission 142 to be shifted to a "neutral" position and command torque converter 146 to be "unlocked," thus allowing operation of hybrid vehicle 140 to be performed in an all-electric mode within speed and torque limitations of the electric drive. During operation, if operator demands require increased speed or acceleration torque above the prescribed limits, transmission control unit 178 may command automatic transmission 142 and/or torque converter 146 to revert back to their original configuration such that heat engine 144 is able to provide the vehicle performance to meet the operator's request through accelerator and brake inputs 150, 152.

Figure 6:
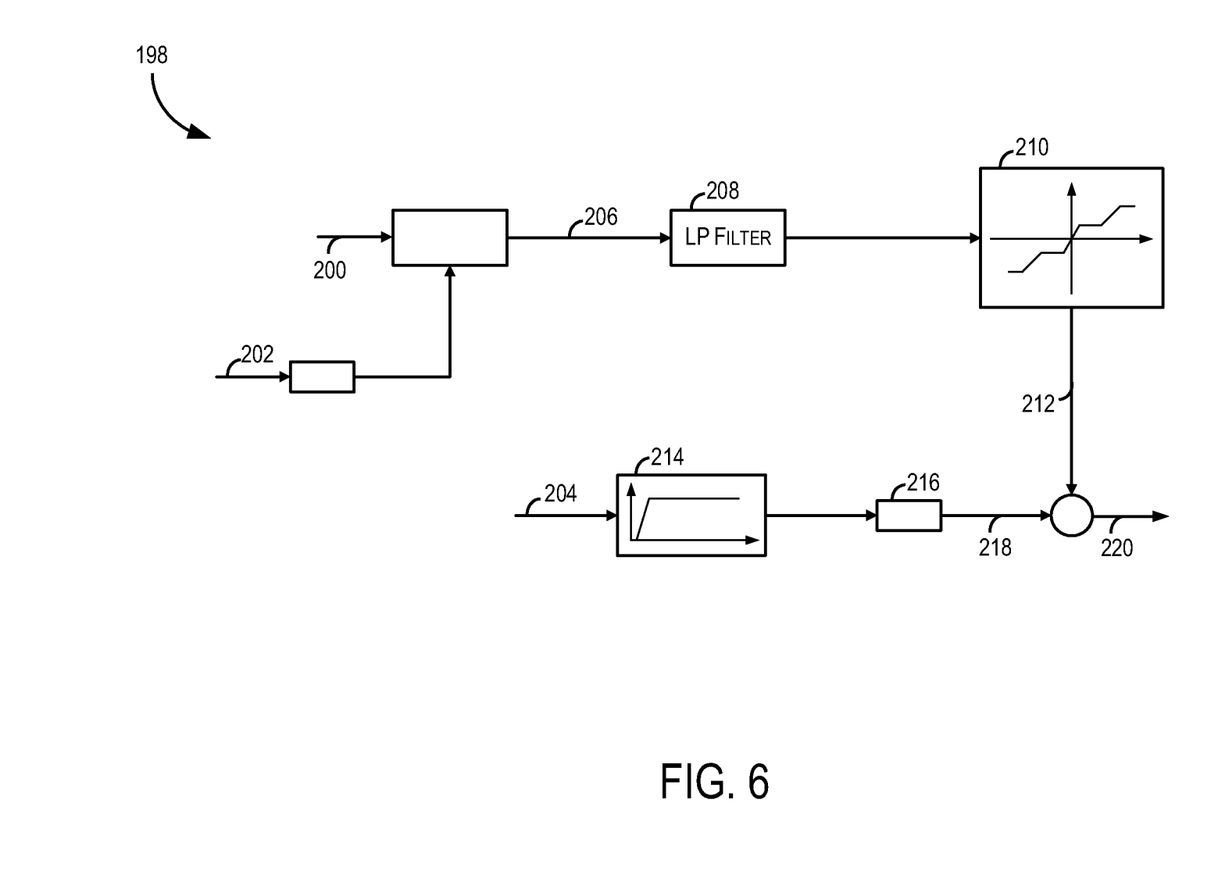
FIG. 6 is a simplified operational diagram of a control strategy for a hybrid vehicle in accordance with an embodiment of the invention.

Referring now to FIG. 6, a simplified operational diagram of a control strategy 198 for a control system for a hybrid vehicle having a vehicle system controller, such as vehicle system control 154 of FIG. 5 is set forth, according to an embodiment of the invention. As shown in FIG. 6, control strategy 198 receives an engine speed signal 200 and a transmission output shaft or motor speed signal 202, such as from sensors 164, 166 of FIG. 5, in addition to an accelerator pedal signal 204, such as from accelerator 150 of FIG. 5.

Using the engine speed signal 200 and the motor speed signal 202, control strategy 198 determines an effective gear ratio 206 in a similar manner as described with respect to effective gear ratio 114 of FIG. 4. The effective gear ratio 206 is passed through a low pass filter 208 and input into torque limit function 210. Control strategy 198 determines a torque to apply to the electric drive based on an output 212 from torque limit function 210.

Control strategy 198 modifies accelerator pedal signal 204 using a ramp function 214 and a variable constant 216. Based on the resulting modified accelerator signal 218 and output 212 from torque limit function 210, control strategy 198 calculates an accelerator pedal torque 220, which is transmitted to the vehicle system controller to replace the original accelerator pedal signal.

In one embodiment, a kit is provided for retrofitting an engine-propelled vehicle, such as, for example, a vehicle having a conventional internal combustion engine (ICE) propulsion system that includes an ICE and a transmission, and at least one propulsive axle coupled to the ICE and at least one non-propulsive axle that is not coupled to the ICE. The kit includes an electric motor that can couple to, or replace, the propulsive axle of the vehicle. The kit also includes an energy storage device coupled to the electric motor to supply energy to the motor and receive energy from at least one of the ICE and an external power grid. A hybrid control system is also included in the kit. The hybrid control system includes a first sensor system to monitor operation of the electric motor and a second sensor system to monitor operation of the ICE. Alternatively, the hybrid control system may be configured to receive information from sensors internal to the ICE propulsion system.

The retrofit kit also includes a user interface into which an operator may input an estimated daily range of travel or an estimated range of travel before the energy storage unit will be charged again. Based on the range estimate, hybrid control system transmits a torque command to the electric motor. According to one embodiment, the hybrid control system determines a transmission shift command and displays the shift command on the user interface. The user interface may optionally include a user-selectable switch to control operation of the hybrid control system between a number of different operational modes, such as an economy mode and sport mode, for example.

Therefore, according to one embodiment of the invention, an apparatus includes a transmission, an engine coupled to an input side of the transmission, and an electromechanical device coupled to an output side of the transmission. The apparatus also includes a differential coupled to the output side of the electromechanical device and a controller coupled to the electromechanical device. The controller is programmed to receive a travel range estimate, monitor an operating characteristic of the engine, and monitor an operating characteristic of the transmission. The controller is further programmed to monitor an operating characteristic of the electromechanical device and control operation of the electromechanical device based on the travel range estimate, the operating characteristic of the engine, the operating characteristic of the transmission, and the operating characteristic of the electromechanical device.

According to another embodiment of the invention, a method of manufacturing a hybrid vehicle includes providing an internal combustion engine (ICE) propulsion system comprising an ICE and a transmission. The method also includes coupling a motor/generator unit to the transmission, coupling the motor/generator unit to a differential via a first drive shaft such that substantially all of a torque output of the ICE is directed through the motor/generator unit to the differential, and providing a first sensor system to monitor operating conditions of the ICE. The method further includes providing a second sensor system to monitor operating conditions of the motor/generator unit and coupling a controller to the motor/generator unit. The controller is programmed to receive a trip range estimate from an operator, receive an output of the first sensor system and an output of the second sensor system, and operate the motor/generator unit based on the trip range estimate and the output of the first and second sensor systems.

According to another embodiment of the invention, a retrofit kit includes an electric motor mechanically coupleable between a transmission and a differential of an internal combustion vehicle, an energy storage system electrically coupleable to the electric motor, and a control system electrically coupleable to the electric motor. The control system is configured to receive a trip estimate corresponding to an expected driving range, monitor operating conditions of the electric motor and the internal combustion vehicle, and operate the electric motor based on the trip estimate and the monitored operating conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus comprising:
    a transmission;
    an engine coupled to an input side of the transmission;
    an electromechanical device coupled to an output side of the transmission;
    a differential coupled to the output side of the electromechanical device; and
    a controller coupled to the electromechanical device, the controller programmed to:
        receive a travel range estimate;
        monitor an operating characteristic of the engine;
        monitor an operating characteristic of the transmission;
        monitor an operating characteristic of the electromechanical device;
        control operation of the electromechanical device based on the travel range estimate, the operating characteristic of the engine, the operating characteristic of the transmission, and the operating characteristic of the electromechanical device; and
        generate a gear shift command based on the travel range estimate, the operating characteristic of the engine, and the operating characteristic of the electromechanical device.

2. The apparatus of claim 1 wherein the controller, in being programmed to monitor the operating characteristic of the engine, is programmed to monitor an engine speed; and
    wherein the controller, in being programmed to monitor the operating characteristic of the electromechanical device, is programmed to monitor an electromechanical device speed.

3. The apparatus of claim 2 wherein the controller is programmed to determine an effective gear ratio based on the engine speed and the electromechanical device speed.

4. The apparatus of claim 1 further comprising a display panel electrically coupled to the controller to display the gear shift command to an operator.

5. The apparatus of claim 1 wherein the controller, in being programmed to control operation of the electromechanical device, is programmed to control operation of the electromechanical device according to an energy efficiency map.

6. The apparatus of claim 1 further comprising an energy storage system coupled to the electromechanical device.

7. The apparatus of claim 1 wherein the transmission comprises a manual transmission including a clutch coupled to the engine.

8. The apparatus of claim 1 wherein the transmission comprises at least one of an automatic transmission and a torque converter.

9. The apparatus of claim 8 further comprising a transmission control unit coupled between the controller and the engine, wherein the transmission control unit is configured to interface with the at least one of an automatic transmission and the torque converter.

10. The apparatus of claim 9 wherein the transmission control unit is programmed to receive signals from the controller and selectively decouple the engine from the electromechanical device based on the received signals.

11. The apparatus of claim 9 wherein the transmission control unit is programmed to receive a transmission shift command from the controller and transmit the transmission shift command to the automatic transmission to cause the automatic transmission to shift gears.

12. The apparatus of claim 9 wherein the transmission control unit is programmed to receive a transmission shift command from the controller and transmit the transmission shift command to the torque converter to cause the torque converter to shift to an unlocked state.

13. The apparatus of claim 1 wherein the electromechanical device is a retrofit electromechanical device that is coupled to the transmission in an engine-propelled vehicle such that the retrofit electromechanical device replaces a propulsive axle of the apparatus.

14. The apparatus of claim 13 wherein the retrofit electromechanical device comprises a display having a visual indicator that illuminates to alert a user whether to up shift or down shift the transmission.

15. A method of retrofitting a vehicle with electric vehicle components comprising:
    providing the vehicle having an internal combustion engine (ICE) propulsion system comprising an ICE and a transmission;
    obtaining a retrofit kit comprised of a motor/generator unit; and
    retrofitting the vehicle by:
        coupling the motor/generator unit to the transmission;
        coupling the motor/generator unit to a differential via a first drive shaft such that substantially all of a torque output of the ICE is directed through the motor/generator unit to the differential; and
        coupling a controller to the motor/generator unit, the controller programmed to:
            receive a trip range estimate from an operator;
            monitor an operating characteristic of the ICE;
            monitor an operating characteristic of the transmission;
            monitor an operating characteristic of the motor/generator unit;
            operate the motor/generator unit based on the trip range estimate, the operating characteristic of the ICE, the operating characteristic of the motor/generator unit, and the operating characteristic of the transmission; and
            generate a gear shift command based on the trip range estimate, the operating characteristic of the ICE, and the operating characteristic of the motor/generator unit.

16. The method of claim 15 wherein retrofitting the vehicle further comprises:
    providing a first sensor system to monitor operating conditions of the ICE; and
    providing a second sensor system to monitor operating conditions of the motor/generator unit;
    wherein the controller is programmed to:
        receive an output of the first sensor system and an output of the second sensor system; and
        operate the motor/generator unit based on the output of the first and second sensor systems.

17. The method of claim 15 wherein coupling the motor/generator unit to the differential comprises:
  providing a first universal joint at a first end of the first drive shaft; and
  coupling the motor/generator unit to the first universal joint via a spline coupling; and
  wherein coupling the first drive shaft to the differential comprises:
  providing a second universal joint at a second end of the first drive shaft; and
  coupling the second universal joint to the differential.

18. The method of claim 15 wherein coupling the motor/generator unit to the transmission comprises coupling the motor/generator unit to the transmission via a second drive shaft.

19. The method of claim 15 further comprising programming the controller to calculate an effective gear ratio based on operating conditions of the ICE and the motor/generator unit.

20. The method of claim 19 further comprising coupling a user interface to the controller, the user interface comprising a user input to receive the trip range estimate and a display module to display the gear shift command.

21. The method of claim 19 further comprising coupling a battery storage unit to the motor/generator unit.

22. The method of claim 15 further comprising coupling at least one of a brake pedal output and an accelerator pedal output to the controller.

23. The method of claim 15 wherein providing the ICE propulsion system comprising a transmission comprises providing an ICE propulsion system comprising a manual transmission.

24. A retrofit kit comprising:
  an electric motor mechanically coupleable between a transmission and a differential of an internal combustion vehicle;
  an energy storage system electrically coupleable to the electric motor; and
  a control system electrically coupleable to the electric motor, the control system configured to:
    receive a trip estimate corresponding to an expected driving range;
    operate the electric motor based on the trip estimate and monitored operating conditions, the monitored operating conditions comprising an operating characteristic of an engine of the internal combustion vehicle, an operating characteristic of the transmission, and an operating characteristic of the electric motor; and
    generate a gear shift command based on the trip estimate, the operating characteristic of the engine of the internal combustion vehicle, and the operating characteristic of the electric motor.

25. The retrofit kit of claim 24 further comprising an operator interface having a trip estimate input coupleable to the control system and configured to allow a user to select the expected driving range.

26. The retrofit kit of claim 25 wherein the control system is further configured to determine the gear shift command based on realtime operating conditions of the internal combustion vehicle and corresponding to an optimal range in which to manually shift gears of a manual transmission; and
  wherein the operator interface is further configured to display the shift command.

27. The retrofit kit of claim 24 wherein the control system, in being configured to monitor operating conditions, is configured to:
  receive an operating speed of an engine of the internal combustion vehicle;
  monitor an operating speed of the electric motor; and
  determine a torque command based on the operating speed of the engine and the electric motor.

28. The retrofit kit of claim 27 wherein the control system is further configured to modify the torque command based on at least one of an accelerator pedal signal and a brake pedal signal.

* * * * *